United States Patent [19]
Bonney

[11] 3,774,504
[45] Nov. 27, 1973

[54] SLIDING SPOOL VALVE
[76] Inventor: Roland W. Bonney, Western Ave., Kennebunkport, Maine
[22] Filed: Mar. 1, 1972
[21] Appl. No.: 230,894

[52] U.S. Cl. ............... 91/446, 91/457, 137/596.13, 137/596.2, 137/636, 137/DIG. 2
[51] Int. Cl. ... F15b 11/08, F15b 13/04, F16k 11/00
[58] Field of Search ............ 137/596, 596.2, 596.12, 137/596.13, 636, DIG. 2; 91/453, 446, 454, 457, 468

[56] References Cited
UNITED STATES PATENTS

| | | | |
|---|---|---|---|
| 904,662 | 11/1908 | Wells | 137/DIG. 2 |
| 1,026,564 | 5/1912 | Crawford | 137/DIG. 2 |
| 2,164,911 | 7/1939 | Garverick | 137/596.2 X |
| 2,526,406 | 10/1950 | Pfauser et al. | 137/596.12 |
| 3,125,120 | 3/1964 | Hasbany | 137/596.2 X |
| 3,216,448 | 11/1965 | Stacey | 137/596.2 |

*Primary Examiner*—Irwin C. Cohen
*Attorney*—Lee A. Strimbeck

[57] ABSTRACT

A valve, particularly useful to control the operation of a single-acting hydraulic cylinder comprises a valve body bored to receive a spool-shaped valve stem adapted to be freely rotatable therein and to be moved longitudinally to effect the operation of the valve. Power fluid is admitted to the valve chamber at the mid-portion of the stem, and power fluid take-off is made from the mid-portion through a ball check valve, which is opened either by the fluid pressure of the incoming fluid or by being engaged by one rim of the spool when the spool is slid forward, this latter position permitting fluid to flow from the take-off line. The spool, when slid in the other direction, seals the discharge line from the valve body, permitting the full pressure of the incoming fluid to be exerted on the check valve. The spool, in its mid-position, permits the valve to constantly discharge and the ball check valve to remain seated and to hold whatever fluid pressure exists in the take-off line.

6 Claims, 5 Drawing Figures (SECTION IV-IV)

SLIDING SPOOL VALVE

THIS INVENTION

This invention is a control valve particularly adapted for use in conjunction with a single-acting hydraulic cylinder such as is used to lift a snowplow blade and hold it in a raised position or to place it in a lowered "float" position. However, as will be apparent, the present valve has many other applications.

In brief compass, the hydraulic valve of this invention consists of a valve body bored to have a cylindrical valve chamber, one end of which serves as a valve seat. The valve body is also bored to have an outlet or discharge port downstream of the valve seat and, upstream in the middle portion of the valve, an inlet line and a power-fluid take-off line, the latter of which has a normally closed check valve operated by either the fluid pressure in the valve or by engagement with a spool-shaped valve stem (referred to hereinafter as a "spool").

The spool is made to be longitudinally slideable and free-rotatable within the valve chamber. One end, the downstream end, of the spool has an annular face, preferably a lip, that is adapted to seat in the valve seat when pulled thereunder or against. The other end of the spool has a tapered shoulder that, when the spool is slid in opposite direction from its closed position, engages and opens the check valve.

The enlarged ends of the spool present approximately the same surface area to the fluid contained therebetween so the valve operates in an approximately pressure-balanced state, i.e., the spool can be longitudinally moved easily from one of its positions to the other regardless of the hydraulic pressure.

The check valve in the power take-off line is preferably a ball check valve spring biased to be normally closed. A face of the ball extends into the valve chamber and is adapted to be engaged and opened by the tapered shoulder of the spool.

The spool remains normally in a mid-position with the discharge line open and the check valve closed, and may be spring biased to do so, although such spring biasing is not desirable in some applications. Thus, hydraulic fluid admitted via the inlet line circulates freely through the valve and discharge port to return to the hydraulic fluid resevoir. When the spool is moved to its seated position, closing the discharge line, the hydraulic pressure builds up, opens the check valve and high pressure fluid flows to the hydraulic cylinder. When the spool is returned to its mid-position, the check valve seats retaining the fluid in the take-off line. When the spool is moved in the position opposite from its seated or closed position, the discharge line remains open and the tapered shoulder of the spool engages and opens the check valve, permitting fluid to drain from the take-off line.

The valve can be left in this last position with the check valve open so that the load on the take-off line can "float," as in the case of a snowplow blade in its lowered position.

The present valve design is simple and uncomplicated. Close tolerances between the spool and the valve body are not required and slight leaking will not noticeably effect the operation of the valve. If the check valve should become worn it can be readily replaced as easily as replacing a sparkplug. The valve can be constructed of whatever materials, plastic, steel, glass, etc., are necessary to meet the conditions of use.

The action of the valve is simple and positive. The valve is admirably suited to being combined with rotary valves whose stems can accept longitudinal movement, as more fully developed in co-pending application, Ser. No. 230,893, filed on even date herewith, and entitled, "Rotary Spool Valve," by the present inventor.

THE DRAWINGS

FIG. 1 illustrates, in longitudinal cross section, the valve of this invention, with the spool in its mid-position;

FIG. 2 similarly illustrates the center portion of the valve with its spool in its seated or closed position;

FIG. 3 likewise illustrates the valve with its spool in the opposite position to operate the check valve;

For simplicity, the same reference numbers for the same parts have been used in the various figures of the drawings.

DESCRIPTION

Figure 4:
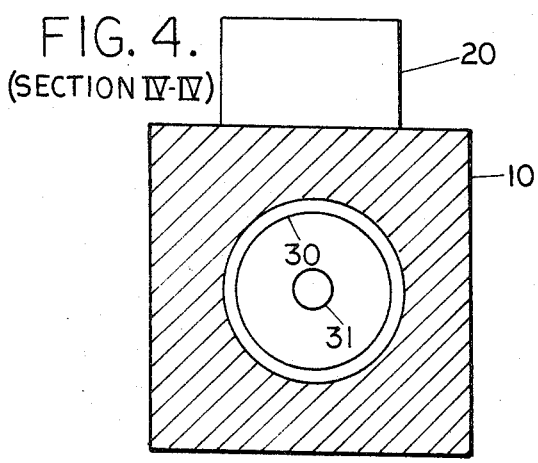
FIG. 4 is a section of the valve taken along line IV — IV of FIG. 1.

With reference to the drawings, the valve body is shown at 10 and, as can be seen from FIG. 4, it can be made from square stock, although it just as well could be round. The oil inlet port is shown at 11 and the discharge port at 12.

The ball check valve and the connection for the power fluid take-off line is shown at 20. The check valve consists of the check ball 21 biased in the closed position with a spring 24 held in place by a snap-in ring 22. The ball seats against a seat 23 and, as can be seen, protrudes slightly into the valve chamber.

The valve body 10 is bored to have a valve chamber 13 and a slightly larger diameter discharge opening 14 with a rim 15 being provided therebetween as a valve seat, although this rim is not necessary, as explained, infra. rim 15 does, however, give a positive seating of the spool and thus a "feel" of the closed position to an operator. Rim 15 will usually have the same internal diameter as bore 13.

A spool 30, shown with an integral handle, although it could be detachably mounted, fits in bore 13. It is held in place by a washer 29 against which a spring 32 acts in a large chamber 16 bored into the valve body. The spring is retained by a nut 33 about the handle, which is sealed, in this case, against fluid loss by an O-ring 34. Other packing gland arrangements could be used and the spring 32 is not necessary to the operation of the valve. Stop positions on the handle 30 external to the valve body could as well be used to tell the operator which of the three positions the valve was in.

The spool 30 is longitudinally slideable within bore 13 from one operating position to another, as shown by direction arrow 38. It is also freely rotatable within the bore as indicated by direction arrow 39.

The stem is centrally bored at 31 and at 31a to provide a passageway for fluid from behind the spool to escape into the discharge conduit 14.

Near the end of the spool there is provided a sealing lip 35 that mates and seats in rim 15. At the other end, the spool has an outwardly tapered shoulder 36. The inner diameter of lip 35 and the outer diamter of shoulder 36 are the same, so that the area presented by the portion 37 below the lip 35 and the shoulder 36 to the axial force of the fluid between the two is approximately the same.

Sealing lip 35 can be dispensed with and the inner face of rim 15 can mate with the cylinder portion 37a of the spool abutting tapering portion 37. In this situation, a stop can be placed on handle 30 to prevent the spool from being too far back and out from under the inner face of rim 15. While this form of seating the spool may have some leakage, it is inconsequential to the operation of the valve.

Figure 1:
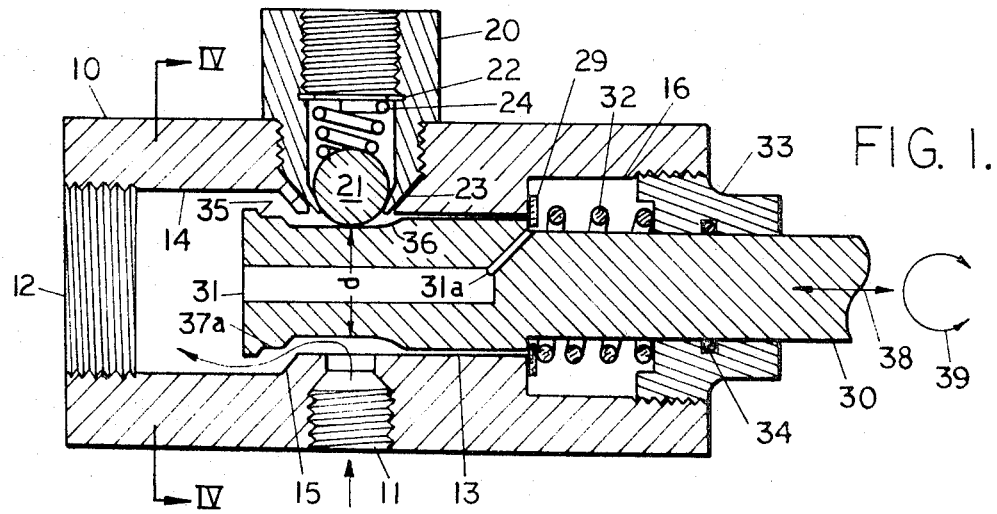

As can be seen from FIG. 1, the intermediate diameter "d" of spool 30 is small enough when the spool is in its mid-position to allow ball 21 to fully seat under the action of spring 24 and to retain any pressure that is confined therebehind. Oil entering through 11 can circulate directly to the discharge port as shown by the flow arrows, and no or little pressure is exerted against ball 21.

Figure 2:
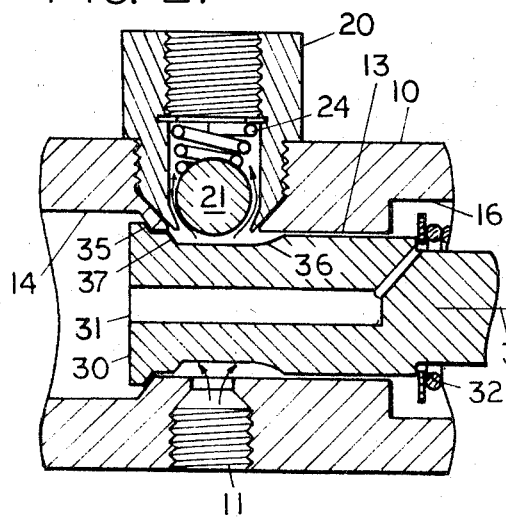

When, as shown in FIG. 2, the spool is seated against valve seat or rim 15, the fluid entering at 11 is forced to act against ball 21, lifting it and allowing the oil to pass into the take-off line and do its work, as shown by the flow arrows.

Figure 3:
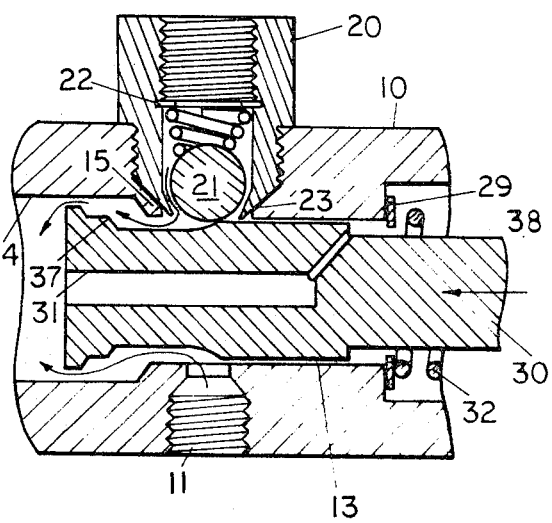

As illustrated in FIG. 3, when spool 30 is shifted in the opposite direction from its mid-position, the discharge port is opened and tapered shoulder 36 engages ball 21 lifting it and allowing oil confined therebehind to flow out of the discharge port, along with the incoming oil that is being bypassed, again as shown by the flow arrows. Since spring 32 is not compressed in this position, the spool can be left in this position to keep the check valve open and allow the load on the take-off line to float.

It can be appreciated that without effecting the operation of the valve, passage 31 can be plugged at its end and radial bores can be used to connect passage 31 to the area of the smallest part of the spool, so that discharge from 31 is out and around lip 35. This arrangement is sometimes desirable when the sliding spool valve is ganged with a rotary spool valve.

Figure 5:
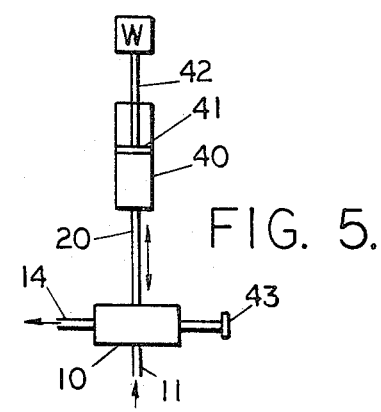
FIG. 5 is a schematic illustration of the valve as used in conjunction with a single-acting hydraulic cylinder.

In FIG. 5, the valve 10 is connected via line 20 to a hydraulic cylinder 40 that has a piston 41 connected by a rod 42 to a weight "W" that is to be raised or lowered. When the handle 43 at the end of spool 30 is pulled to place the valve in the position shown in FIG. 2, oil enters cylinder 40, and the weight is raised. When the handle 43 is returned to the valve's mid-position, as in FIG. 1, oil is trapped in the cylinder, and the weight remains in a fixed position. When the handle 43 is pushed to put the valve in the position shown in FIG. 3, then oil can escape from cylinder 41, and the weight lowers.

The desirable simple construction of the valve is quite apparent from the drawings. The spool consists of a single machined rod with no mid-diameter larger than the diameter of lip 35. The valve body is of a single piece of stock simply and easily bored from either end and the sides, and tapped, with the valve chamber having the smallest internal diameter. Therefore, the spool can be simply dropped into place (from left to right in the drawings), without need to fit sectioned pieces together or the use of recessed retaining rings.

If, in operation, the fit of the spool is poor enough to permit oil to pass into chamber 16, which, if not relieved, would hinder the longitudinal movement of the spool, this oil can escape via passages 31 and 31a.

I claim:
1. A valve comprising:
 a. a valve body bored to have a cylindrical valve chamber one end of which defines a valve-seat, a discharge conduit therefrom downstream of said valve seat and upstream of said valve seat an inlet conduit and a power-fluid take-off conduit;
 b. a cylindrical spool slideably mounted within said valve chamber, extending through said valve seat and having (1) an end downstream of said valve seat adapted to mate and form a seal with said valve-seat when said spool is in a closed position, (2) a mid-portion of smaller diameter, both said inlet conduit and said take-off conduit facing the same when said spool is in a mid-position with said spool end being unseated, and (3) on the other end an enlarged tapered shoulder no larger than the diameter of said end; means for sliding said spool from said mid-position in one direction in said valve chamber to said closed position, and in the other direction to bring said tapered shoulder into the zone of said mid-position; and
 c. a check valve in said take-off conduit at the end facing said valve chamber, said check valve having a valve member normally biased in the closed position and opening (1) when engaged by said tapered shoulder, and (2) under the pressure of power-fluid in said valve chamber when said spool is in said closed position.

2. The valve of claim 1 wherein the opposing cross-sectional areas of the ends of said spool containing power-fluid when said spool is in said closed position are approximately equal and the pressures tending to move said spool in one direction or the other are approximately balanced, the interior diameter of said valve seat being approximately the same as the largest diameter of said valve chamber.

3. The valve of claim 1 wherein said check-valve is a spring loaded ball check valve, the face of the ball of which extends slightly into said valve chamber and engages said tapered shoulder.

4. The valve of claim 1 wherein said end of said spool downstream of said valve seat has a radially extending lip of diameter larger than the diameter of said valve chamber, and wherein said valve-seat has a face mating with said lip when said spool is in said closed position.

5. The valve of claim 1 wherein said means for sliding said spool comprises:
 d. a valve handle connecting with said spool beyond said tapered shoulder and extending from said falve body along the axis of rotation of said spool;
 e. means for biasing said spool to return to said mid-position from said closed position; and
 f. sealing means adapted to prevent the passage of fluid between said valve body and said valve handle; and wherein
said spool has an interior passageway adapted to permit fluid to flow from beyond said tapered shoulder into said discharge conduit, and said spool is freely rotatable within said valve chamber without effecting the operation of said valve.

6. The combination of the valve of claim 1 with a single acting hydraulic cylinder, the inlet of said hydraulic cylinder being connected with said power-fluid take-off conduit.

* * * * *